US012678722B1

(12) United States Patent
Farrar et al.

(10) Patent No.: US 12,678,722 B1
(45) Date of Patent: Jul. 14, 2026

(54) METHOD OF SUPPLYING POTABLE WATER TO A RECREATION VEHICLE

(71) Applicant: CAMCO MANUFACTURING, LLC,
Greensboro, NC (US)

(72) Inventors: Lucas Farrar, Oak Ridge, NC (US);
Niko Jovicevic, Statesville, NC (US);
Bruce Andrew Angel, Stokesdale, NC
(US); Brandon Blakely, Burlington,
NC (US); Casey Daniel Leonard,
Lexington, NC (US)

(73) Assignee: Camco Manufacturing, LLC,
Greensboro, NC (US)

( * ) Notice: Subject to any disclaimer, the term of this
patent is extended or adjusted under 35
U.S.C. 154(b) by 418 days.

(21) Appl. No.: 18/461,560

(22) Filed: Sep. 6, 2023

(51) Int. Cl.
B01D 35/30 (2006.01)
B01D 35/157 (2006.01)
B01D 37/00 (2006.01)

(52) U.S. Cl.
CPC ....... B01D 35/306 (2013.01); B01D 35/1573
(2013.01); B01D 37/00 (2013.01); *B01D*
*2201/167* (2013.01); *B01D 2201/4092*
(2013.01)

(58) Field of Classification Search
None
See application file for complete search history.

(56) References Cited

U.S. PATENT DOCUMENTS

| 3,540,594 | A | * | 11/1970 | Sanderson | ........... | B01D 35/306 |
| | | | | | | 210/232 |
| 3,684,100 | A | * | 8/1972 | Close | ..................... | B01D 35/14 |
| | | | | | | 210/444 |
| 3,746,171 | A | * | 7/1973 | Thomsen | ............. | B01D 35/153 |
| | | | | | | 210/440 |
| 3,748,837 | A | * | 7/1973 | Billeter | .................... | B61G 5/08 |
| | | | | | | 251/315.1 |
| 3,756,275 | A | * | 9/1973 | Barrera | ............... | F16K 11/0743 |
| | | | | | | 137/590 |
| 3,777,889 | A | * | 12/1973 | Henderson | ............. | B01D 35/14 |
| | | | | | | 210/135 |
| 3,907,688 | A | * | 9/1975 | Close | ................... | B01D 35/147 |
| | | | | | | 210/444 |

(Continued)

FOREIGN PATENT DOCUMENTS

| WO | WO-2023024859 | A1 | * | 3/2023 | ............. | B01D 29/03 |
| WO | WO-2023071366 | A1 | * | 5/2023 | ............. | B01D 35/30 |

*Primary Examiner* — Robert J Popovics
(74) *Attorney, Agent, or Firm* — Tuggle Duggins P.A.;
Blake P. Hurt

(57) ABSTRACT

A water filter adapter including a manifold defining an inlet
port configured to couple with an output of a water filter
module and an outlet port configured to couple with an input
connection of a system, for example a water tank of an RV
or boat. The water filter adapter further includes a shutoff
valve assembly positioned between the inlet port and the
outlet port for controlling the flow of water at the input
connection of the system rather than an external water
source, such as campsite hook-ups or marina connections. In
a preferred embodiment the outlet port is offset about ninety
degrees from the inlet port to minimize the flow path
post-filtration as much as possible while still facilitating a
secure connection between the water filter adapter and the
input connection of the system and between the water filter
adapter and the water filter module.

15 Claims, 8 Drawing Sheets

(56) References Cited

U.S. PATENT DOCUMENTS

| | | | | | |
|---|---|---|---|---|---|
| 3,926,815 A * | 12/1975 | McClory | B01D 35/043 | | 137/625.22 |
| 3,935,106 A * | 1/1976 | Lipner | B01D 35/043 | | 210/418 |
| 4,013,562 A * | 3/1977 | Gott | C02F 9/20 | | 210/232 |
| 4,046,692 A * | 9/1977 | Braukmann | B01D 29/94 | | 210/426 |
| 4,082,673 A * | 4/1978 | Cilento | B01D 36/001 | | 210/429 |
| 4,102,473 A * | 7/1978 | Draxler | B01D 46/00 | | 220/295 |
| 4,271,020 A * | 6/1981 | Van Meter | B01D 29/96 | | 137/625.29 |
| 4,379,053 A * | 4/1983 | Brane | B01D 35/147 | | 210/419 |
| 4,529,515 A * | 7/1985 | Selz | B01D 35/14 | | 210/420 |
| 4,570,673 A * | 2/1986 | Kendrick | F16L 27/047 | | 285/302 |
| 4,603,887 A * | 8/1986 | Mayfield | F16L 27/1275 | | 285/298 |
| 4,731,183 A * | 3/1988 | Schumacher, II | B01D 35/153 | | 210/419 |
| 4,735,716 A * | 4/1988 | Petrucci | B01D 46/0004 | | 210/500.21 |
| 4,806,240 A * | 2/1989 | Giordano | B01D 27/08 | | 210/232 |
| 4,857,189 A * | 8/1989 | Thomsen | B01D 29/27 | | 210/DIG. 17 |
| 4,877,521 A * | 10/1989 | Petrucci | B01D 29/018 | | 210/450 |
| 4,882,061 A * | 11/1989 | Petrucci | C02F 1/441 | | 210/257.2 |
| 4,903,716 A * | 2/1990 | Stevens | B60R 15/00 | | 134/168 R |
| 4,915,831 A * | 4/1990 | Taylor | B01D 35/30 | | 55/504 |
| 4,938,241 A * | 7/1990 | Teel | E03F 1/00 | | 134/201 |
| 4,948,505 A * | 8/1990 | Petrucci | B01D 46/106 | | 210/438 |
| 4,956,086 A * | 9/1990 | Thomsen | B01D 35/30 | | 55/504 |
| 5,056,544 A * | 10/1991 | Stevens | B60R 15/00 | | 134/96.1 |
| 5,102,543 A * | 4/1992 | Burroughs | B01D 35/147 | | 137/625.23 |
| 5,107,896 A * | 4/1992 | Otto | F16K 11/085 | | 210/418 |
| 5,139,050 A * | 8/1992 | Otto | C02F 1/003 | | 210/418 |
| 5,283,552 A * | 2/1994 | Sol | G01M 3/2815 | | 73/40.5 R |
| 5,304,300 A * | 4/1994 | Parsons | B01D 35/02 | | 55/508 |
| 5,334,309 A * | 8/1994 | Huggett | B01D 35/153 | | 210/136 |
| 5,354,464 A * | 10/1994 | Slovak | B01D 65/00 | | 210/240 |
| 5,456,830 A * | 10/1995 | Stanford | B01D 35/153 | | 210/443 |
| 5,486,288 A * | 1/1996 | Stanford | B01D 35/153 | | 210/443 |
| 5,653,871 A * | 8/1997 | Thomsen | B01D 35/30 | | 210/450 |
| 6,250,336 B1 * | 6/2001 | Murphey | F16K 15/044 | | 137/539.5 |
| 6,432,305 B1 * | 8/2002 | Sumner | B01D 35/0273 | | 210/232 |
| 6,592,769 B1 * | 7/2003 | Erickson | B01D 21/0093 | | 210/801 |
| 6,695,891 B2 * | 2/2004 | Reid | B01D 46/0004 | | 55/482 |
| 6,977,006 B2 * | 12/2005 | Reid | B01D 46/2411 | | 55/482 |
| 7,017,602 B2 * | 3/2006 | Garver | F16L 41/021 | | 137/355.27 |
| 7,048,129 B2 * | 5/2006 | Skillings | C02F 1/003 | | 210/446 |
| 7,186,338 B2 * | 3/2007 | Boisvert | B01D 35/30 | | 210/450 |
| 7,468,135 B2 * | 12/2008 | Holt | C02F 3/288 | | 210/150 |
| 7,651,070 B2 * | 1/2010 | Ruprecht | B01D 35/30 | | 210/420 |
| 8,091,594 B2 * | 1/2012 | Ray | B67D 7/0294 | | 141/346 |
| 8,562,830 B2 * | 10/2013 | Reid | B01D 46/009 | | 210/232 |
| 8,888,998 B2 * | 11/2014 | Swain | B01D 35/147 | | 210/90 |
| 9,084,952 B2 * | 7/2015 | Namur | B01D 35/147 | |
| 9,314,722 B2 * | 4/2016 | Reid | B01D 35/306 | |
| 9,550,135 B2 * | 1/2017 | Pribanic | B01D 35/005 | |
| 9,675,908 B2 * | 6/2017 | Pribanic | B01D 27/08 | |
| 10,669,162 B2 * | 6/2020 | Stricker | C02F 1/002 | |
| 10,737,206 B2 * | 8/2020 | Reid | B01D 46/0004 | |
| 11,091,363 B1 * | 8/2021 | Martin | F16L 33/02 | |
| 11,351,935 B2 * | 6/2022 | Van Beek | B60R 15/00 | |
| 11,773,572 B2 * | 10/2023 | Maack | F16K 17/403 | | 137/68.11 |
| 11,890,570 B2 * | 2/2024 | Boel | B01D 46/0004 | |
| 11,912,212 B2 * | 2/2024 | Van Beek | B63B 29/14 | |
| 11,912,213 B2 * | 2/2024 | Van Beek | E03D 9/10 | |
| 12,193,419 B2 * | 1/2025 | Jankiewicz | A01K 63/045 | |
| 12,253,193 B1 * | 3/2025 | Blakely | F16L 21/002 | |
| 12,427,466 B2 * | 9/2025 | Steijnen | B01D 46/88 | |
| D1,112,641 S * | 2/2026 | Julber | D23/262 | |
| 12,560,259 B1 * | 2/2026 | Blakely | F16L 3/1075 | |
| 2005/0109409 A1 * | 5/2005 | Skillings | C02F 1/003 | | 137/625.29 |
| 2006/0021655 A1 * | 2/2006 | Garver | F16L 41/021 | | 137/356 |
| 2010/0116730 A1 * | 5/2010 | Mitchell | B01D 35/147 | | 210/235 |
| 2012/0031821 A1 * | 2/2012 | Swain | B01D 35/30 | | 210/232 |
| 2015/0182894 A1 * | 7/2015 | Shaffer | B01D 35/147 | | 210/238 |
| 2020/0270031 A1 * | 8/2020 | Brieschke | B60P 3/36 | |
| 2021/0214925 A1 * | 7/2021 | Maack | E03B 7/10 | |
| 2025/0206222 A1 * | 6/2025 | Poetschke | B60P 3/36 | |

* cited by examiner

METHOD OF SUPPLYING POTABLE WATER TO A RECREATION VEHICLE

FIELD OF THE INVENTION

The disclosure herein pertains to water filtration generally, and particularly pertains to a water filter adapter with an integrated shutoff valve for use in connection with recreational vehicle ("RV") and maritime water filtration systems.

DESCRIPTION OF THE PRIOR ART AND OBJECTIVES OF THE INVENTION

Recreational vehicles ("RVs") and maritime vessels heavily depend on various onboard systems to ensure their comfort and safety, with one of the most crucial components being the water storage tank. Whether embarking on long, extended journeys or enjoying extended stays at a campsite or marina, having a readily available source of clean, potable water is of utmost importance for drinking, cooking, and maintaining hygiene. In most cases, potable water is made available at locations such as campsites or marinas; however, to ensure the water's quality before it enters the onboard water storage tank, standalone water filtration components are typically employed. These filtration modules effectively remove unwanted particulates from the water, safeguarding the integrity of the entire water supply system.

Traditionally, filtration modules are installed at input connections located on the exterior of the RV or maritime vessel, typically in a control cabinet and receive water from external sources such as campsite hook-ups or marina connections. Previously, the use of external hoses is generally required to connect the water filtration module to the input connection of the system, which may result in several unwanted consequences. Firstly, the additional hosing downstream of the water filtration module results in the water filtration module being offset further from the exterior of the system, which may create a potential tripping hazard within the confined spaces around an RV or vessel, and also increases the likelihood that equipment may be damaged. The closer the water filtration module can be positioned to the input connection of the system, the less likely it is to introduce a potential tripping hazard. Furthermore, the less the water filtration module is offset from the control cabinet of various systems, the more likely the water filtration module may be fully enclosed within the cabinet containing the input connection.

Standalone water filtration components, including additional hosing, is generally stored within a cabinet of the RV or vessel when it is no longer needed. This presents a unique challenge because any hosing needed downstream of the filtration module has a high likelihood of becoming contaminated with unwanted particulates. The hosing upstream from the water filtration module is not as big of a concern, because any water flowing through the first hose will still be filtered before entering the water storage tank of the system. For this reason, eliminating any hosing from the water filtration module to the input connection of the system will greatly reduce the likelihood that unwanted particulates will contaminate the water post filtration prior to entering the water storage tank.

Furthermore, water filtration components do not have an integrated shutoff valve allowing a user to control the flow of water at the input connection of the system, rather the user is typically required to stop the water flow at external sources such as campsite hook-ups or marina connections. If this step is inadvertently missed, water may be spilled around the system, components may be damaged, and contamination may occur. A water filtration module with an integrated shutoff valve, providing a visual cue of the status of the water flow, and allowing the user to control the water flow at the input connection of the system will reduce the likelihood that these situations occur.

Thus, in view of the problems and disadvantages associated with prior art devices, the present disclosure was conceived to provide a highly desirable, novel approach that streamlines the filtration process by eliminating the need for additional hosing post filtration, minimizing the offset of the filtration module from the input connection located on the exterior of the system, and incorporating an integrated shutoff valve at the input connection.

It is an objective of the present disclosure to provide a water filter adapter including an integrated shutoff valve, allowing a user to control the flow of water at the input connection of the system rather than at external sources such as campsite hook-ups or marina connections.

It is another objective of the present disclosure to provide a water filter adapter that minimizes the distance the water filtration module is offset from the input connection on the exterior of the system.

It is still another objective of the present disclosure to provide a water filter adapter that minimizes the flow path downstream of the water filter module by removing the need for an additional hose connecting the water filtration module to the input connection of the system.

It is yet another objective of the present disclosure to provide a water filter adapter that is affordable to manufacture and minimizes assembly costs.

It is a further objective of the present disclosure to provide a water filter adapter that defines an outlet port that is offset between about seventy-five degrees and about ninety degrees from an inlet port.

Various other objectives and advantages of the present disclosure will become apparent to those skilled in the art as a more detailed description is set forth below.

SUMMARY OF THE INVENTION

The aforesaid and other objectives are realized by providing a water filter adapter for systems containing a water storage tank, the water filter adapter is configured to reduce the offset of a water filtration module from an input connection of a system, to minimize the flow path downstream of the water filtration module by removing the need for a hose connecting the water filtration module to the input connection of the system, and to facilitate an integrated shutoff valve at the input connection of the system. The water filter adapter of the present disclosure may include a manifold that defines an inlet port configured to couple with the water filtration module, and an outlet port configured to couple directly to the input connection of the system. In a preferred embodiment, the inlet port is generally oriented along a first axis and the outlet port is generally oriented along a second axis, and the first axis and second axis are about perpendicular to one another to reduce the offset distance of the water filtration module when coupled to the input connection of the system. The inlet port may be defined by an inner collar including an internal thread that is compatible with and may threadably couple with water filtration modules including an output with an external thread. The outlet port may be defined by a conduit including an external thread that is compatible with and may threadably couple with input connections of various systems containing water storage tanks with an internal thread. In alternative embodiments, the inlet port may define an external thread and the outlet port may define an internal thread. The water filter adapter of the present disclosure may include a shutoff valve assembly positioned between the inlet port and outlet port to provide a visual cue to the user of the status of the water flow, and to facilitate a way to control the water flow at the input connection of the system rather than at external sources such as campsite hook-ups or marina connections.

DETAILED DESCRIPTION OF THE PREFERRED EMBODIMENT AND OPERATION OF THE INVENTION

Figure 1:
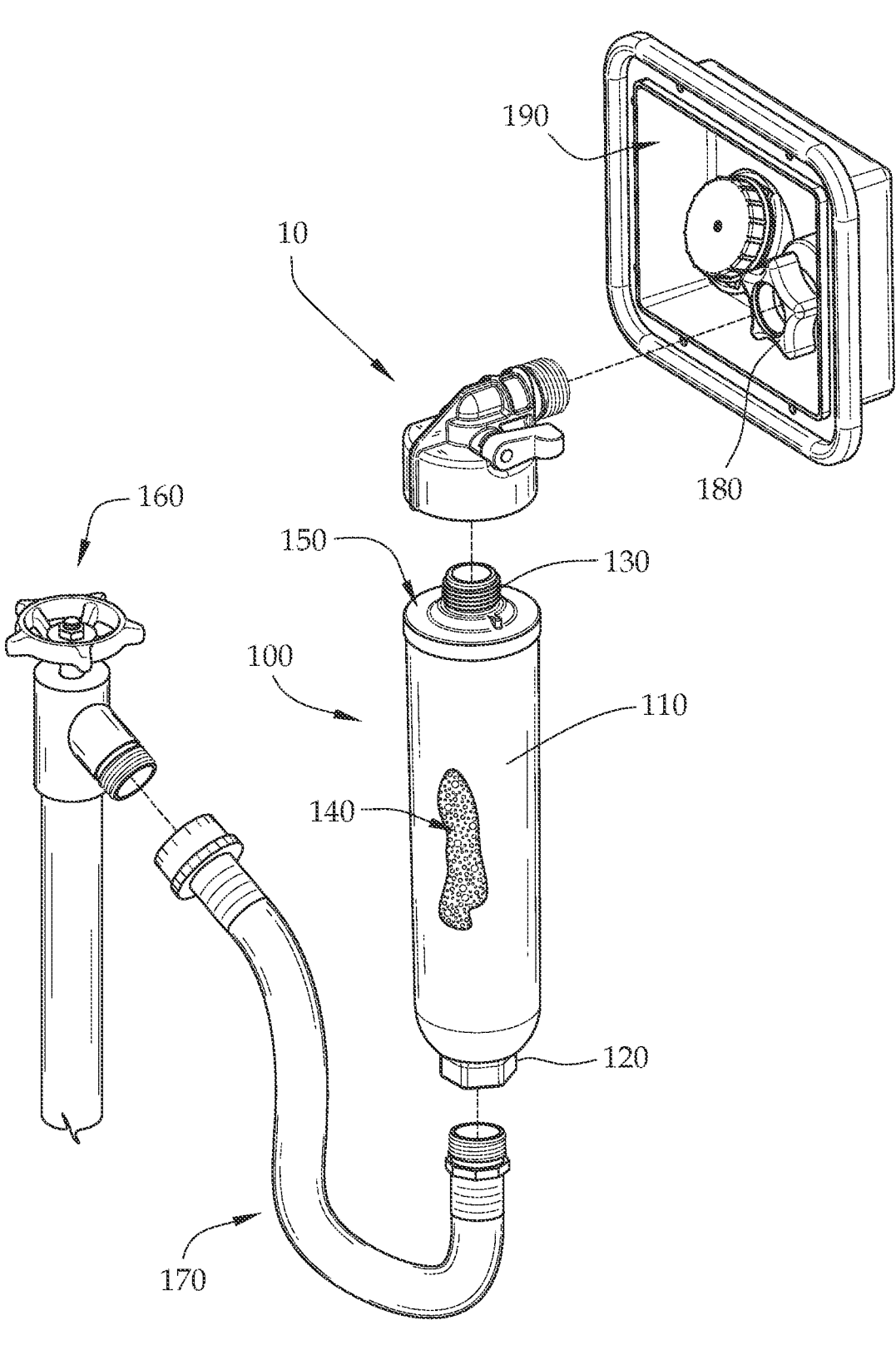
FIG. 1 demonstrates an exploded view of an embodiment of a water filter adapter prior to coupling with a system and a water filter module and external water source.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

For a better understanding of the disclosure and its operation, turning now to the drawings, FIGS. 1-6 illustrate various views and orientations of a water filter adapter generally designated as water filter adapter 10. The water filter adapter 10 may include a manifold 12 defining an inlet port 14, an outlet port 16, one or more conduits 18, 20 facilitating fluid communication between the inlet port 14 and the outlet port 16. In a preferred embodiment, the water filter adapter 10 may include a shutoff valve assembly 52 moveable between a first position in which the inlet port 14 and outlet port 16 are in fluid communication and a second position in which the inlet port 14 and outlet port 16 are not in fluid communication. The inlet port 14 is preferably defined by an inner collar 22 including an internal thread 25 (FIG. 6) for coupling with an output 130 of a water filter module 100 as seen in FIG. 1. The outlet port 16 is preferably defined by a tube 26 including an external thread 28 (FIG. 5) for coupling with an input connection 180 of a system 190, such as storage tank of a recreational vehicle ("RV") or maritime vessel. In the preferred embodiment, the inner collar 22 is oriented along a first axis 30 and the tube 26 is oriented along a second axis 32 about ninety degrees opposite the first axis 30. The manifold 12 may further define an outer collar 34 configured to rest on a top surface 150 of the water filter module 100 when the inner collar 22 is coupled with the output 130 of the water filter module 100, thereby relieving the mechanical strain subjected to the output 130 of the water filtration module 100 and the input connection 180 of the system 190.

FIG. 1 demonstrates an exploded view of an embodiment of a water filter adapter 10 prior to coupling with a water filter module 100 and a system 190. The water filter module 100 includes a casing 110 defining an input 120 and an output 130, in which the input 120 is configured to couple with an external water source 160 via a hose 170 and the output 130 is configured to couple with the inlet port 14 of the water filter adapter 10. A filtration medium 140 is placed within the casing 110 to remove any unwanted particles from a liquid flowing along a flow path "P" defined between the input 120 and the output 130 when the valve assembly 52 is in the first position. The filtration medium may include activated carbon, catalytic carbon, kinetic degradation flux-ion, a reverse osmosis membrane, activated aluminum, manganese dioxide, ultraviolet light, and combinations thereof. In one embodiment, the output 130 of the water filter module 100 is configured (i.e., sized, shaped, and otherwise capable) to threadably couple with the internal thread 25 of the inner collar 22 defining the inlet port 14. In the preferred embodiment, the system 190 includes an input connection 180 configured (i.e., sized, shaped, and other-wise capable) to threadably couple with the external thread 28 of the tube 26 defining the outlet port 16. In the preferred embodiment, the liquid (i.e., water) potentially including unwanted particles will enter the input 120, the filtration medium 140 will remove any unwanted particles in the liquid, and the liquid, free of any unwanted particles, will flow out of the output 130 of the water filter module 100. One important aspect of the present disclosure is that the water filter adapter 10 minimizes the flow path downstream of the water filter module 100, thereby reducing the likeli-hood of foreign particles being introduced post filtration prior to entering the system 190. In one embodiment, after the liquid has passed through the filtration module 100, the liquid will flow into the inlet port 14, through a first conduit 18 formed by the inner collar 22, through a second conduit 20 formed by the tube 26, and out of the outlet port 16 into the system 190. Another important aspect of the present disclosure is that the water filter adapter 10 may include the shutoff valve assembly 52 which allows a user to initiate or halt liquid flow directly at the input connection 180 of the system 190 rather than having to initiate or halt liquid flow at the external water source 160. In the preferred embodi-ment, after the liquid has passed through the filtration module 100, the liquid will flow into the inlet port 14, through the first conduit 18 formed by the inner collar 22, past the valve assembly 52 (i.e., when the valve assembly is configured in a first position), through the second conduit 20 formed by the tube 26, and out of the outlet port 16 into system 190.

Figure 2:
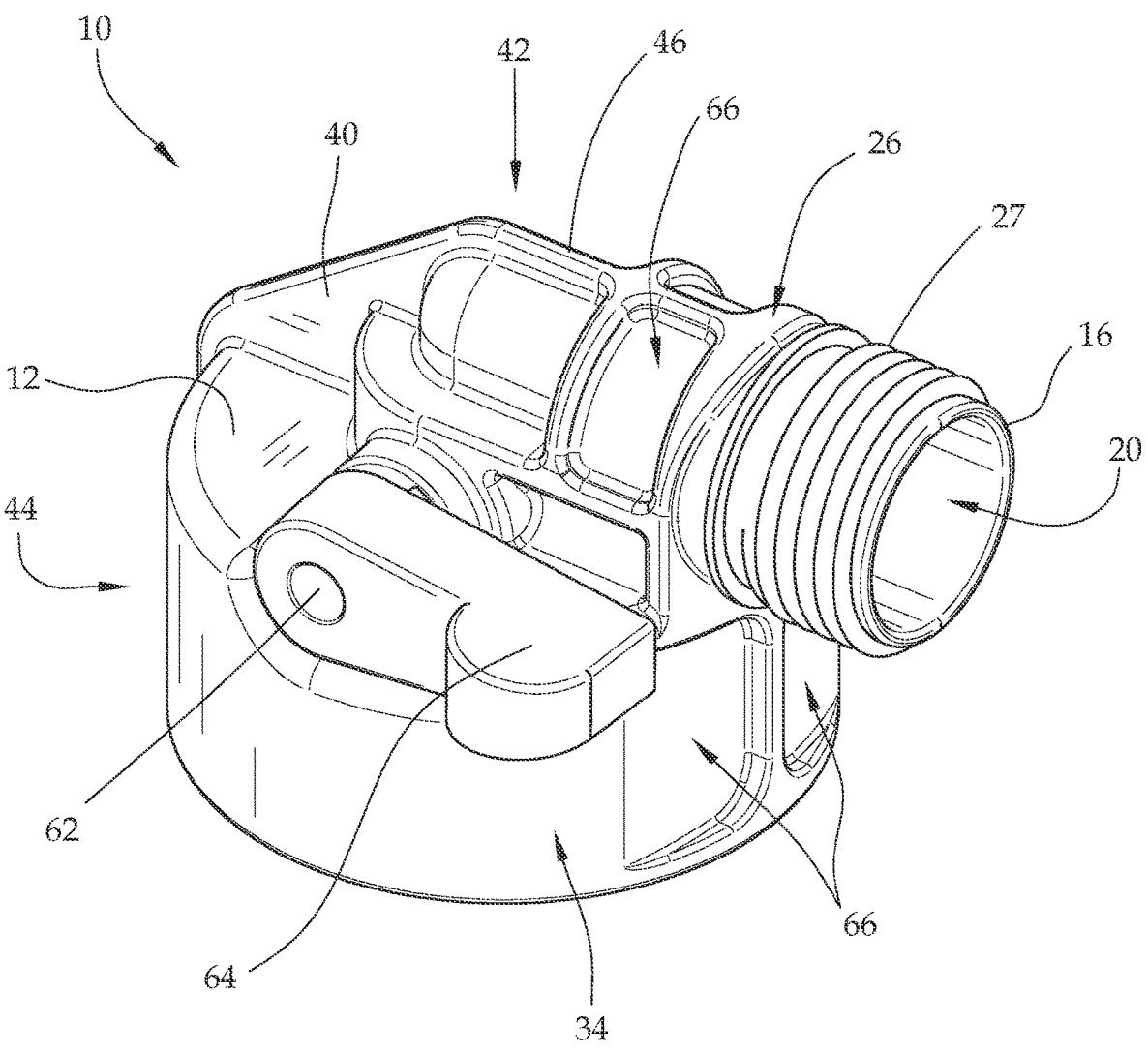
FIG. 2. shows a front perspective view of the embodiment of the water filter adapter of the present disclosure.

FIG. 2. shows a front perspective view of the embodiment of the water filter adapter 10 of the present disclosure. In the preferred embodiment, the manifold 12 includes the outer collar 34, the inner collar 22, and the tube 26. The outer collar 34 is an annular wall defining an interior surface 38 and an exterior surface 36. The outer collar 34 is generally sized and shaped to correspond to the top surface 150 of the water filter module 100 so that the outer collar 34 may relieve the mechanical strain subjected to the output 130 of the water filtration module 100 and the input connection 180 of the system 190 when the inner collar 22 is coupled with the output 130 of the water filter module 100. The manifold

Figure 3:
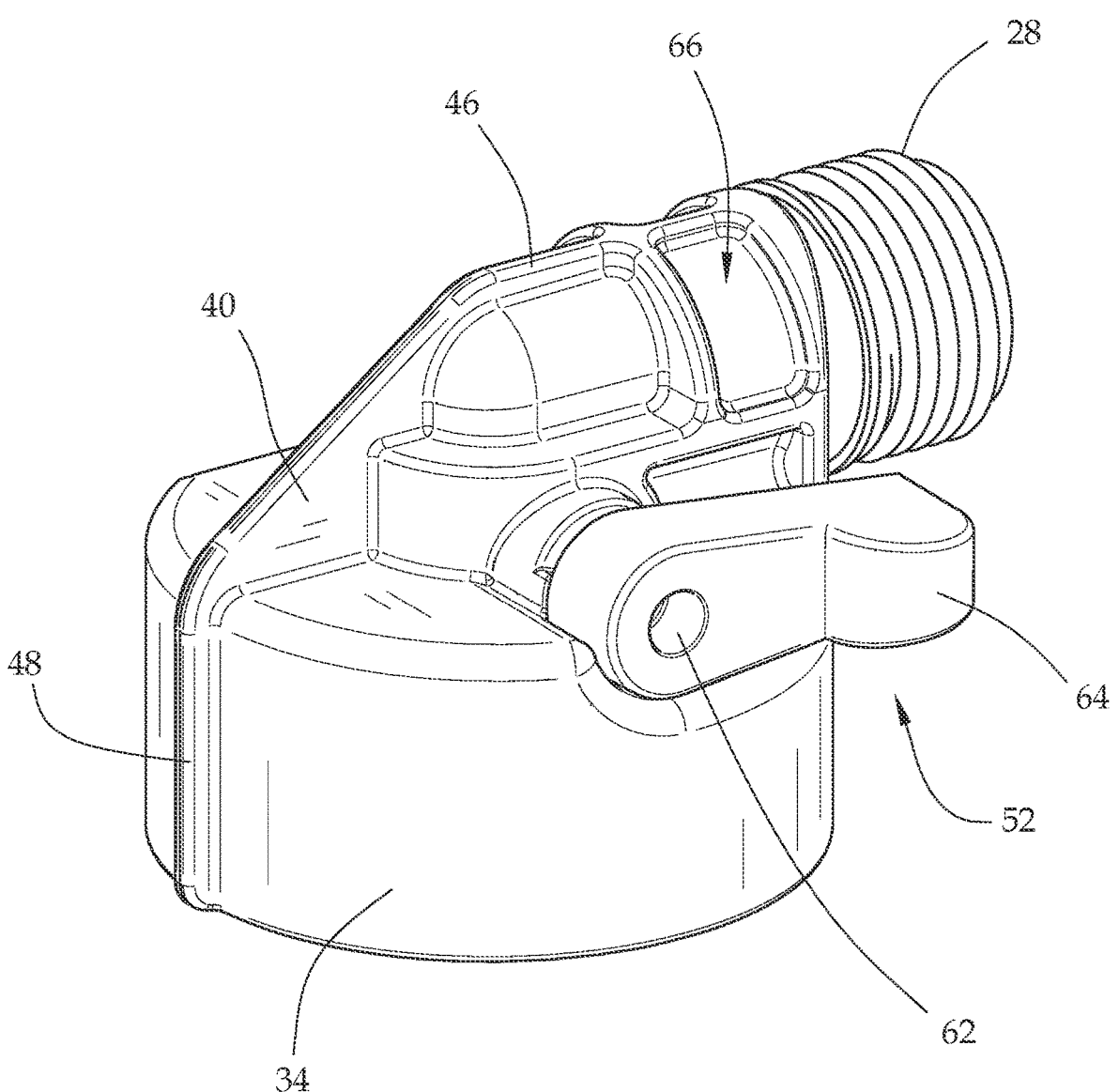
FIG. 3 illustrates a rear perspective view of an embodiment of the water filter adapter shown in FIG. 2.

12 may further include a flange 40 bridging the outer collar 34 and the tube 26 to allow for easy handling of the water filter adapter 10 and to reinforce the manifold 12. It is preferable that the flange 40 bridging the outer collar 34 and the tube 26 extends along a top side 42 of the manifold 12, forming a top external rib 46 on an exterior surface 27 of the tube 26, and further extends along a rear side 44 of the manifold 12, forming a rear external rib 48 on the exterior surface 36 of the outer collar 34 (as best shown in FIG. 3). The manifold 12 may further include one or more indenta-tions 66 to also facilitate easy handling of the water filter adapter 10 and reinforce the manifold 12. In the preferred embodiment, as shown in FIG. 2, an exterior surface 27 of the tube 26 may define one or more indentations 66 and exterior surface 36 of the outer collar 34 may also define one or more indentations 66. In the preferred embodiment, the external threads 28 formed on an exterior surface 27 of the tube 26 are configured (i.e., sized, shaped, and otherwise capable) to threadably couple to the input connection 180 of the system 190.

FIG. 3 illustrates a rear perspective view of an embodi-ment of the water filter adapter 10 shown in FIG. 2. As illustrated in FIG. 3, the preferred embodiment includes the rear external rib 48 extending along the rear side 44 of the manifold 12 to facilitate easy handling of the water filter adapter 10 and to reinforce the manifold 12. As will be described in further detail in the proceeding disclosure, a stem 62 of the shutoff valve assembly 52 is positioned protruding from a side of the manifold 12 and the stem 62 further includes a handle 64. The stem 62 may be connected to a ball 54 positioned within the manifold 12 between the first conduit 18 and the second conduit 20. The handle 64 may be moveable between a first position in which the inlet port 14 and outlet port 16 are in fluid communication and a second position in which the inlet port 14 and outlet port 16 are not in fluid communication. In the preferred embodi-ment, a quarter turn of the handle 64 will rotate the stem 62 and move the ball 54 between the first position and the second position.

Figure 4:
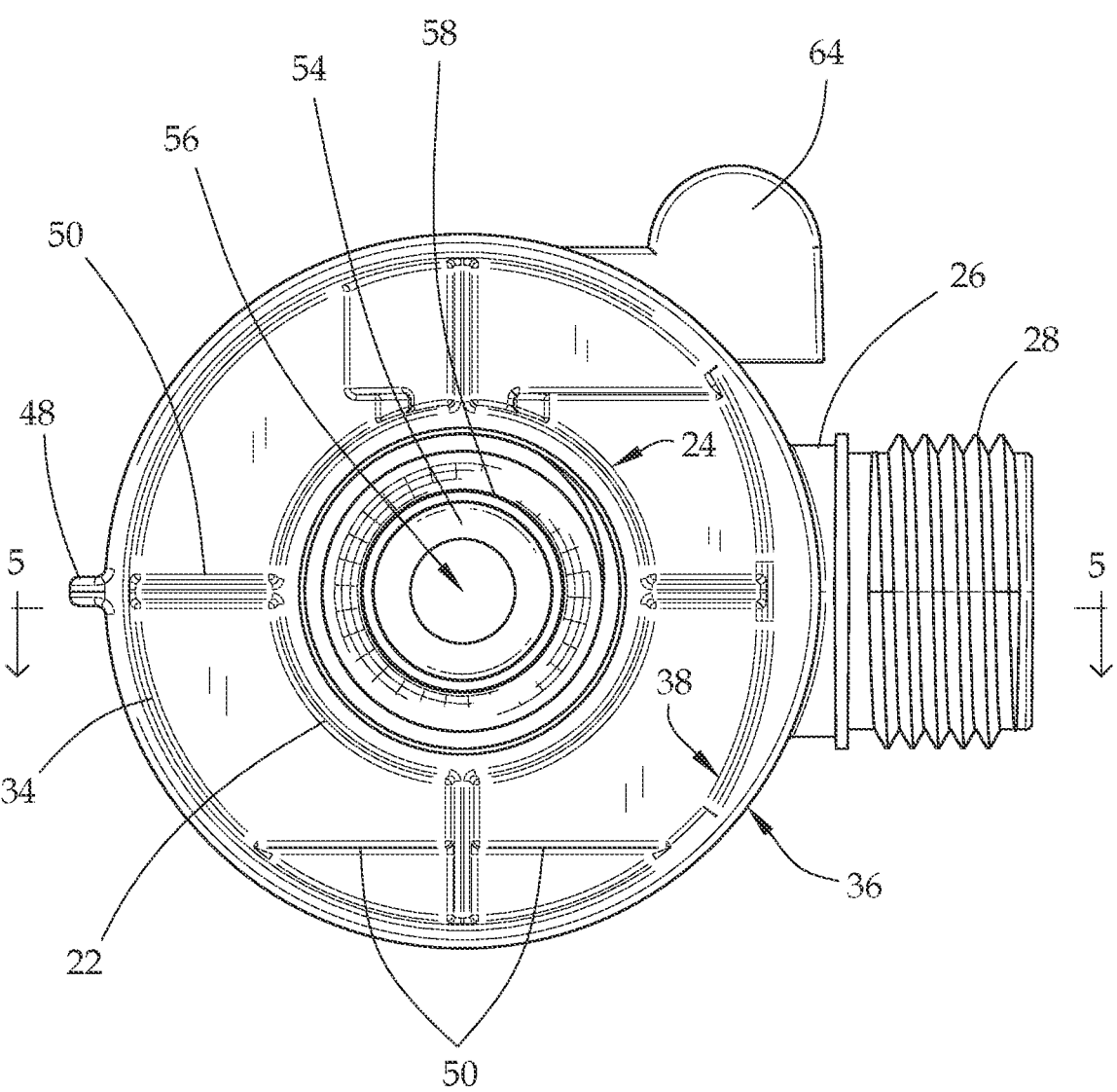
FIG. 4 features a bottom plan view of the water filter adapter as shown in FIG. 2 and FIG. 3.

FIG. 4 features a bottom perspective view of the water filter adapter 10 as shown in FIG. 2 and FIG. 3. The inner collar 22 defines the inlet port 14 and the first conduit 18 and includes the internal threads 25. The inner collar 22 is configured (i.e., sized, shaped, and otherwise capable) to threadably couple with the output 130 of the water filter module 100. The outer collar 34 may be configured (i.e., sized, shaped, and otherwise capable) to rest on a top surface 150 of the water filter module 100 when the water filter adapter 10 is connected to the water filter module 100. The outer collar 34 increases the strength and rigidity of the connection between the input 120 of the water filter module 100 and the inlet port 14 of the inner collar 22 by relieving the mechanical strain on the inner collar 22. The outer collar 34 may be concentric with the inner collar 22 and a plurality of ribs 50 may extend between the interior surface 38 of the outer collar 34 and an exterior surface 24 of the inner collar 22 to reinforce the manifold 12, particularly the inner collar 22. As described herein, the plurality of ribs 50 are thin, elongated projections or walls that extend generally perpen-dicular between the inner collar 22 and the outer collar 34.

Figure 5:
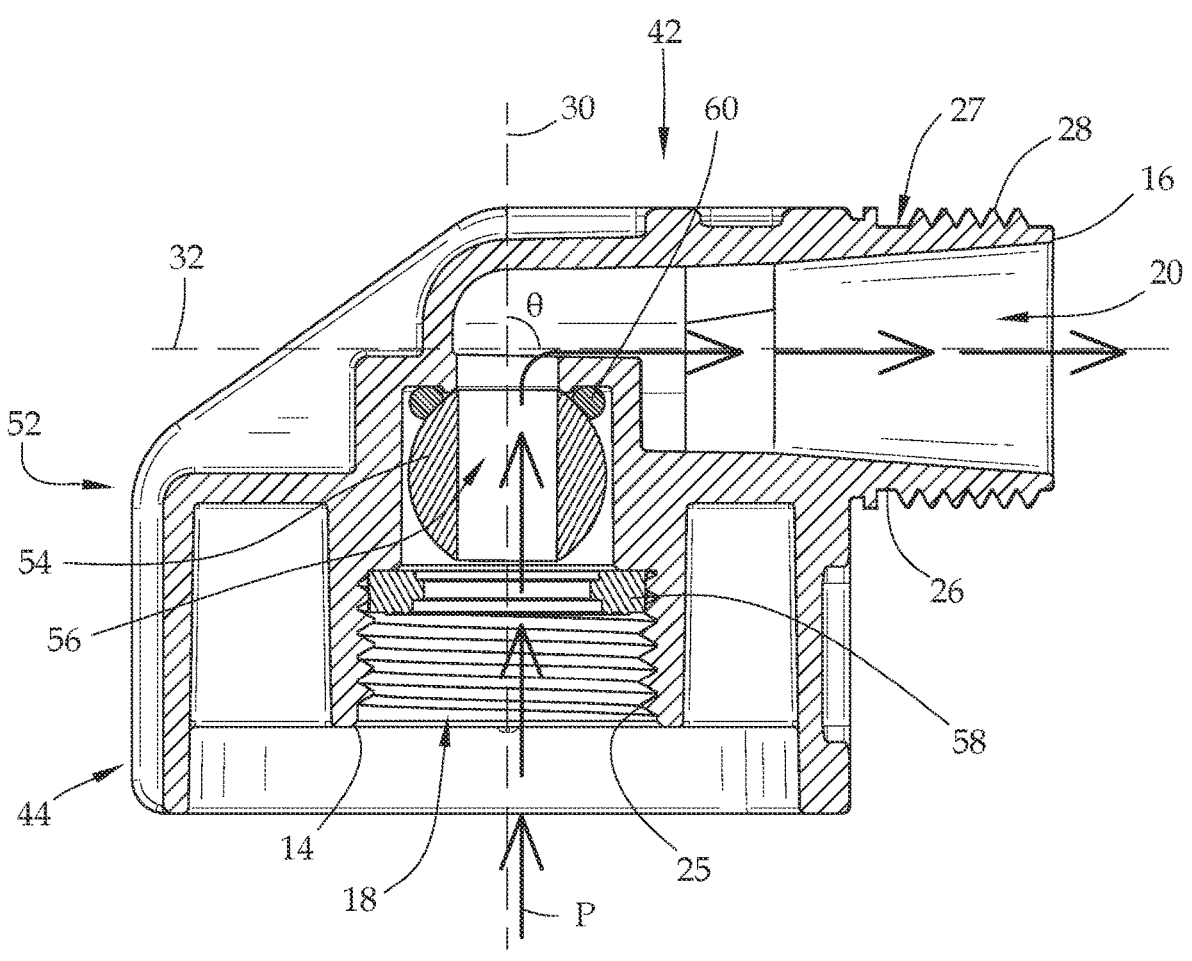
FIG. 5 depicts a cross-sectional view of the water filter adapter as seen along lines 5-5 of FIG. 4, showing the shutoff valve assembly in a first, open position.

FIG. 5 depicts a cross-sectional view of the water filter adapter 10 along lines 5-5 of FIG. 4, showing the shutoff valve assembly 52 in the first position. As previously men-tioned, in the preferred embodiment, the shutoff valve assembly 52 defines an inline ball valve including a ball 54 defining a bore 56, a first seat 58 positioned upstream of the ball 54, a second seat 60 positioned downstream of the ball

7

Figure 6:
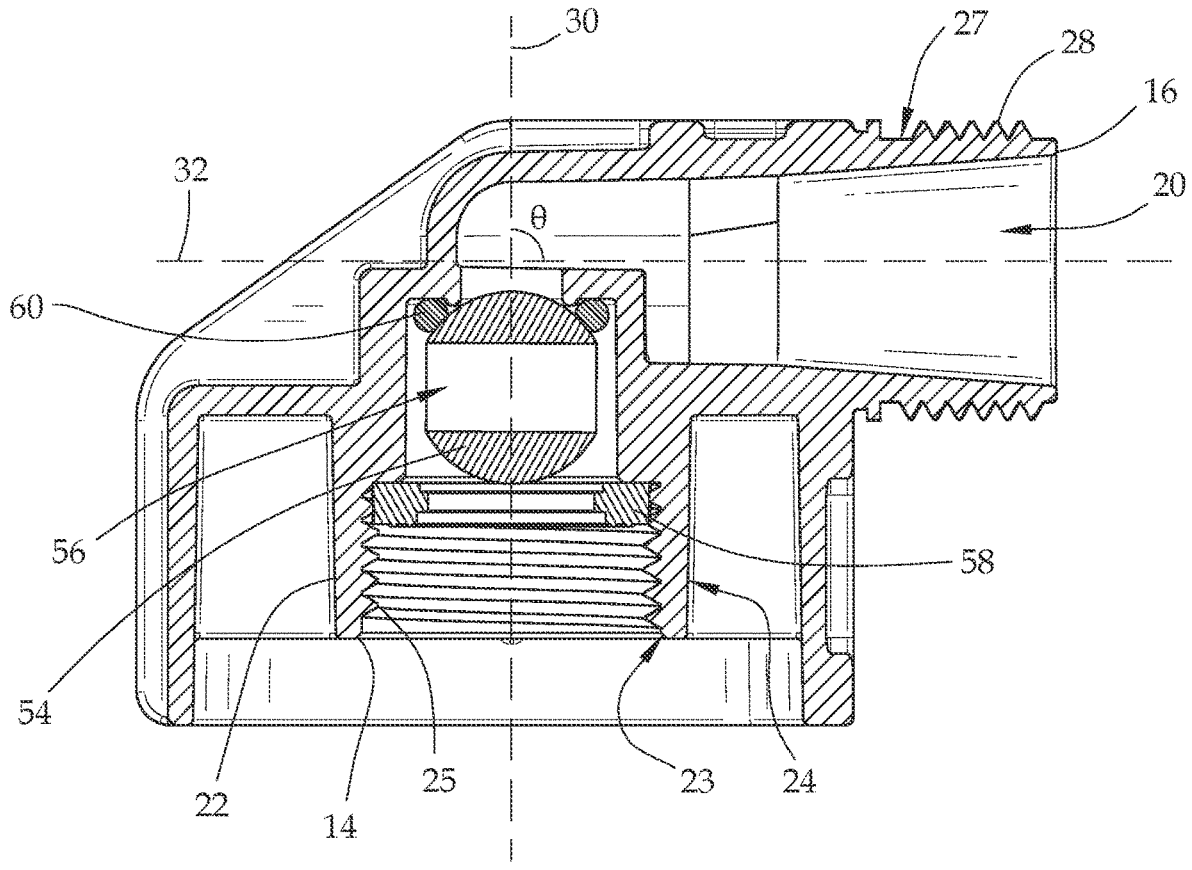
FIG. 6 demonstrates a cross-sectional view of the water filter adapter as seen along lines 5-5 of FIG. 4, showing the shutoff valve assembly in a second, closed position.
Figure 7:
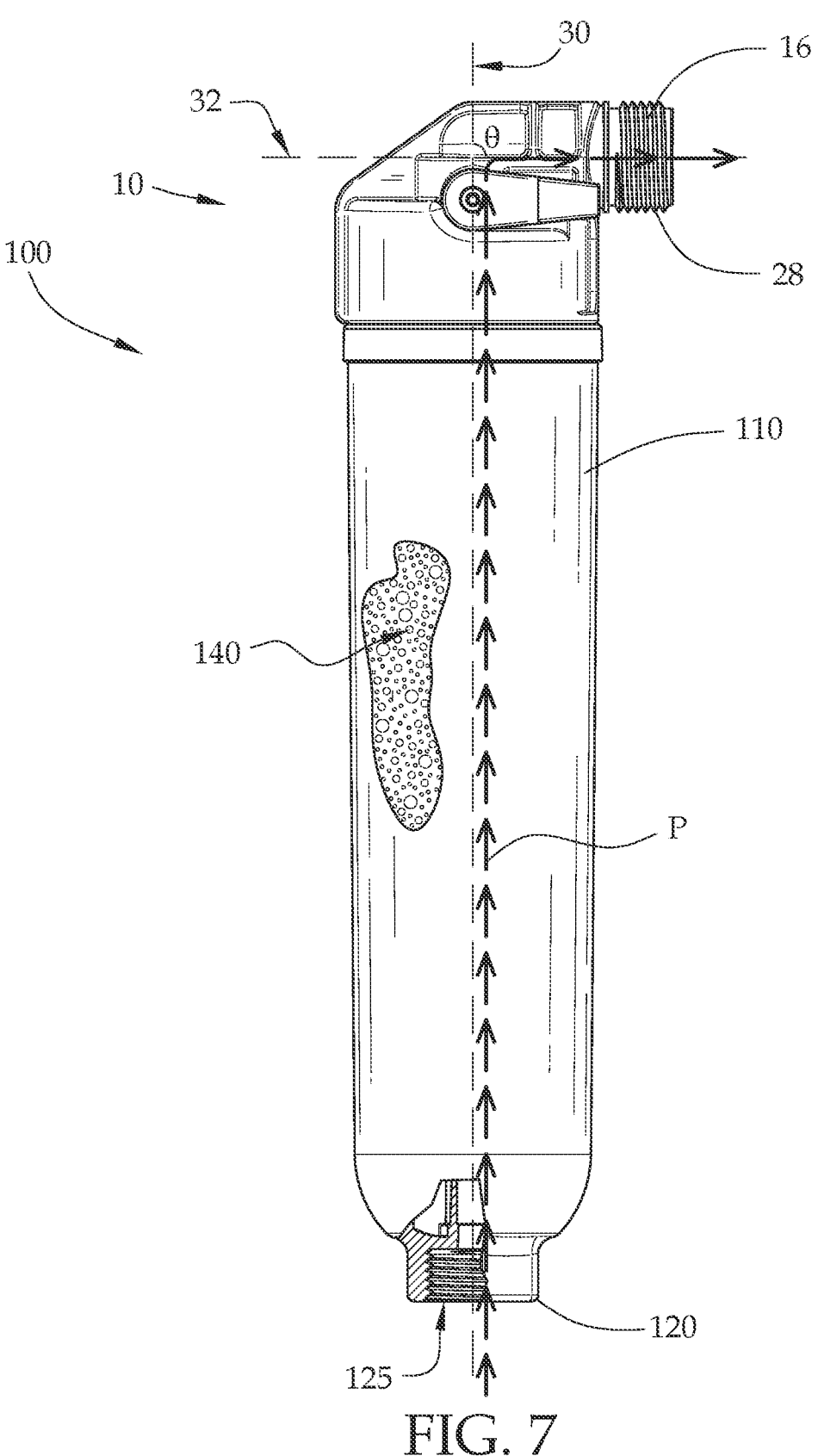
FIG. 7 illustrates an embodiment of a water filter module with the water filter adapter of the present disclosure.

54, and a stem 62 connected to the ball 54 and the stem 62 having a portion extending outside the manifold 12, the portion extending outside the manifold 12 including a handle 64. The valve assembly 52 is preferably located between the first conduit 18 and the second conduit 20 to control the flow of liquid. When in the first or open position, the bore 56 of the ball 54 is oriented parallel to the flow path "P" resulting in the inlet port 14 and outlet port 16 being in fluid communication. FIG. 6 demonstrates a cross-sectional view of the water filter adapter 10 as seen along lines 5-5 of FIG. 4, showing the shutoff valve assembly 52 in the second position. In the preferred embodiment, the handle 64 may be rotated a quarter-turn counterclockwise from the first position (as shown in the FIGS.) to reposition the valve assembly 52 in the second or closed position. When in the second position, the bore 56 of the ball 54 is oriented perpendicular to the flow path "P" resulting the inlet port 14 and outlet port 16 not being in fluid communication and liquid not flowing out of the outlet port 16.

In the preferred embodiment, the inlet port 14 is generally oriented along the first axis 30 and the outlet port 16 is generally oriented along a second axis 32, and the first axis 30 and second axis 32 are offset at an angle between seventy-five degrees and ninety degrees. An angle between about seventy-five and ninety degrees facilitates a connection with many input connections 180 located in control cabinets on the exterior surface of systems 190, such as the storage tank of a recreational vehicle ("RV") or maritime vessel. In the preferred embodiment, as shown in the FIGS., the inlet port 14 and the outlet port 16 are generally offset by about ninety degrees (i.e., perpendicular to one other). This offset angle greatly reduces the amount of mechanical strain on the input 120 of the water filtration module 100, the input connection 180 of the system 190, and on the inlet port 14 and outlet port 16 of the water filter adapter 10. In most instances, this offset angle will position the casing 110 of the water filtration module 100 alongside the exterior surface of the system 190, reducing the amount of movement and torque created by the water filtration module 100.

In the preferred embodiment, as described herein, the internal thread 25 and external thread 28 of the water filter adapter 10 define a ¾"-11.5 NH thread which is a common thread type found on many recreational vehicles ("RVs") and maritime vessels. In other embodiments, the internal thread 25 and external thread 28 may define a different thread type, such as a ½" NPT thread, or ½" BSP thread.

In the preferred embodiment, the manifold 12 is manufactured using a plastic injection molding method. It is preferrable various components of the adapter 10, such as the manifold 12 be constructed using plastic materials suitable for plastic injection molding, such as, but not limited to, acrylic (PMMA), acrylonitrile butadiene styrene (ABS), nylon (polyamide, PA), polycarbonate (PC), polyethylene (PE), polyoxymethylene (POM), polypropylene (PP), polystyrene (PS), thermoplastic elastomer (TPE), thermoplastic polyurethane (TPU), and combinations thereof. These materials generally offer a lightweight alternative to other metallic materials, further reducing the amount of mechanical strain on the input 120 of the water filtration module 100, the input connection 180 of the system 190, and on the inlet port 14 and outlet port 16 of the water filter adapter 10. The first seat 58 and second seat 60 may be formed using a polytetrafluoroethylene resin, carbotite, or other similar materials capable of withstanding repeated frictional contact with the ball 54 as it rotates between the first position and the second position. In the preferred embodiment, the first seat 58 may define a silicone washer and the second seat 60 may define a rubber O-ring. It is also preferred that the ball 54 be formed of a material that has a low coefficient of friction, such as, but not limited to polyoxymethylene.

Figure 8:
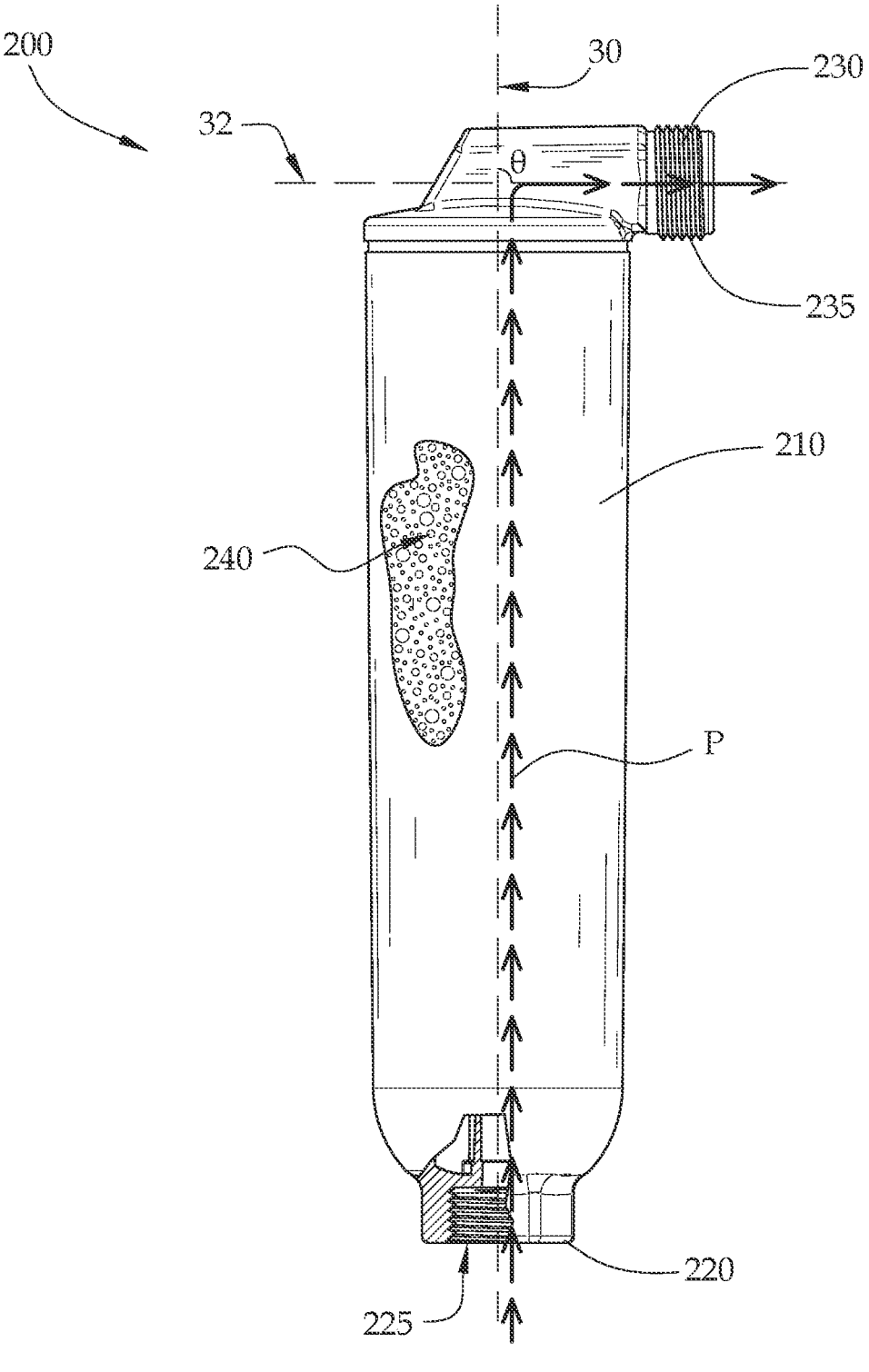
FIG. 8 shows an alternative embodiment of a water filter module.

Also considered within the scope of this disclosure, as shown in FIG. 8, is a water filter module 200 including a casing 210 defining an input 220 and an output 230, and a filtration medium 240 placed within the casing between the input 220 and the output 230. As disclosed in FIG. 8, the input 220 may be oriented along a first axis 30, the output 230 is oriented along a second axis 32, and the first axis 30 is offset from the second axis 32 by an angle θ between seventy-five and ninety degrees. It is also preferrable that the input 220 includes an internal thread 225 configured to couple with a hose 170 connected to an external water source 160, and the output 230 includes an external thread 235 configured to couple with an input connection 180 of a system 190.

In one embodiment, water filter module 200, as illustrated in FIG. 8, may not include the shutoff valve assembly 52 of the adapter 10 which further reduces the flow path P post filtration. Unlike water filter module 100 that defines an input 120 and an output 130 which are aligned along the same axis (see FIG. 1), in a preferred embodiment, water filter module 200 includes the input 220 along a first axis 30 and the output 230 that is oriented along the second axis 32 which is about ninety-degrees offset from the first axis 30. Removing the valve assembly 52 further minimizes the flow path P post filtration by removing the need for an additional hose connecting the water filtration module 200 to the input connection 180 of the system 190.

The illustrations and examples provided herein are for explanatory purposes and are not intended to limit the scope of the appended claims.

We claim:
1. A method of supplying potable water to a recreation vehicle, comprising the steps of:
  providing:
    a water filter module (100) including:
      a casing (110) defining an input (120) at a lower end thereof and an outlet (130) at an upper end thereof;
      a filtration medium (140) capable of purifying water, disposed within the casing (110); and
    a water filter adapter (10) including:
      a manifold (12) defining:
        an inlet port (14);
        an outlet port (16);
        at least one upstream conduit (18) in fluid communication with inlet port (14);
        at least one downstream conduit (20) in fluid communication with outlet port (16);
          wherein said at least one upstream conduit (18) and said at least one downstream conduit (20) facilitate fluid communication between the inlet port (14) and the outlet port (16);
        an integrated shutoff valve assembly (52) moveable between a first position in which the inlet port (14) and outlet port (16) are in fluid communication and a second position in which the inlet port (14) and outlet port (16) are not in fluid communication;
  coupling the outlet (130) of the casing (110) to the inlet port (14) of the manifold (12);
  coupling the input (120) of the casing (110) to a source of water; and
  directly coupling the outlet port (16) to an input connection (180) of a water storage system (190) of the recreation vehicle, without any hosing between the outlet port (16) and the input connection (180).

2. The method of supplying potable water to a recreation vehicle of claim 1, further comprising:

flowing unfiltered water from the source of water through the filtration medium (140) of the water filter module (100), and filtered water through the water filter adapter (10) and input connection (180), into the water storage system (190).

3. The method of supplying potable water to a recreation vehicle of claim 2, further comprising:

moving the integrated shutoff valve assembly (52) from the first position to the second position, to stop the flowing of filtered water into the water storage system (190).

4. The method of supplying potable water to a recreation vehicle of claim 1, wherein the filtration medium is selected from the group consisting of activated carbon, catalytic carbon, kinetic degradation fluxion, a reverse osmosis membrane, activated aluminum, manganese dioxide, ultraviolet light, and combinations thereof.

5. The method of supplying potable water to a recreation vehicle of claim 1, wherein the inlet port (14) further includes an internal thread (25) and the outlet port (16) further includes an external thread (28).

6. The method of supplying potable water to a recreation vehicle of claim 5, wherein the internal thread (25) defines a ¾"-11.5 NH thread.

7. The method of supplying potable water to a recreation vehicle of claim 5, wherein the external thread (28) defines a ¾"-11.5 NH thread.

8. The method of supplying potable water to a recreation vehicle of claim 1, wherein the integrated shutoff valve assembly (52) includes a ball (54) defining a bore (56), a first seat (58) positioned upstream of the ball (54), a second seat (60) positioned downstream of the ball (54), and a stem (62) connected to the ball (54) and the stem (62) having a portion extending outside the manifold (12), the portion extending outside the manifold (12) including a handle (64).

9. The method of supplying potable water to a recreation vehicle of claim 8, wherein the first position is defined when the bore (56) of the ball (54) is parallel to a flow path ("P").

10. The method of supplying potable water to a recreation vehicle of claim 8, wherein the second position is defined when the bore (56) of the ball (54) is perpendicular to a flow path ("P").

11. The method of supplying potable water to a recreation vehicle of claim 1, wherein inlet port (14) is generally oriented along a first axis (30) and the outlet port (16) is generally oriented along a second axis (32), and the first axis (30) and the second axis (32) are offset at an angle between seventy-five degrees and ninety degrees.

12. The method of supplying potable water to a recreation vehicle of claim 1 wherein, the inlet port (14) is generally oriented along a first axis (30), and the outlet port (16) is generally oriented about ninety degrees opposite the first axis (30).

13. The method of supplying potable water to a recreation vehicle of claim 1 wherein, the manifold (12) further includes an inner collar (22) defining the inlet port (14) and an outer collar (34) reinforcing the inner collar (22).

14. The method of supplying potable water to a recreation vehicle of claim 13, wherein a plurality of ribs (50) extend between the inner collar (22) and the outer collar (34).

15. The method of supplying potable water to a recreation vehicle of claim 1, wherein the manifold (12) is manufactured using plastic injection molding.

\* \* \* \* \*